United States Patent [19]

Hayes et al.

[11] Patent Number: 4,582,957

[45] Date of Patent: Apr. 15, 1986

[54] CALL INTERCEPTOR

[75] Inventors: Bernard L. Hayes, Hancock, N.H.; Lawrence E. Bergeron, N. Andover, Mass.; Richard Bergeron, Salem, N.H.; Deane C. Osborne, Brookline, Mass.

[73] Assignee: Wang Laboratories, Inc., Lowell, Mass.

[21] Appl. No.: 454,894

[22] Filed: Dec. 30, 1982

[51] Int. Cl.⁴ .................... H04M 1/65; H04M 3/54
[52] U.S. Cl. ........................ 179/18 BE; 179/6.16; 179/84 C
[58] Field of Search ........... 179/18 B, 18 BE, 27 FG, 179/27 FH, 84 C, 6.03, 6.16, 6.17, 18 E, 18 AD

[56] References Cited

U.S. PATENT DOCUMENTS

| | | | |
|---|---|---|---|
| 3,141,931 | 7/1964 | Zarouni | 179/6.11 |
| 3,925,622 | 12/1975 | Robinson | 179/18 BE |
| 3,959,600 | 5/1976 | Sousa | 179/18 BE |
| 3,965,304 | 6/1976 | Marheine | 179/18 B |
| 4,139,739 | 2/1979 | von Meister et al. | 179/18 B |
| 4,229,624 | 10/1980 | Haben et al. | 179/18 E |
| 4,256,928 | 3/1981 | Lesea et al. | 179/18 BE |
| 4,327,251 | 4/1982 | Fomenko et al. | 179/18 B X |
| 4,413,158 | 11/1983 | Danford | 179/90 BD |
| 4,476,349 | 10/1984 | Cottrell et al. | 179/18 B |
| 4,484,031 | 11/1984 | Gray et al. | 179/18 BE |

FOREIGN PATENT DOCUMENTS 1536843 12/1978 United Kingdom .......... 179/18 AD

OTHER PUBLICATIONS

"Unanswered Call Diverter", Brody et al., *IBM Technical Disclosure Bulletin*, vol. 25, No. 7A, pp. 3480, 3481, Dec. 1982.

"Calling or Called Number Feature for Telephone System", Brody et al., *IBM Tech. Disclosure Bulletin*, vol. 25, No. 7B, Dec. 1982, pp. 3961-3962.

*Primary Examiner*—Thomas W. Brown
*Attorney, Agent, or Firm*—Michael H. Shanahan; Gordon E. Nelson

[57] ABSTRACT

Automatic telephone answering equipment is disclosed which is associated with a telephone set connected to a switching system along with other telephone sets, and the answering equipment functions with central message recording equipment which is also connected to the switching system. Unanswered incoming calls originating from within or without the switching system are answered by the automatic answering equipment which then transfers the call to either another of the telephone sets or to the message recording equipment, as selected by the user of the answering equipment. When the call is transferred to the central message recording equipment the identity of the telephone set to which the call was directed is forwarded to the recording equipment. Only upon the calling party recording a message in the central message recording equipment, the recording equipment uses the called telephone set identity to call the originally called telephone set. Upon the telephone answering equipment answering the call from the message recording equipment the recording equipment sends a signal which causes a message waiting visual indication to be provided at the answering equipment. Thereafter, in response to the visual message waiting signal the message recording equipment may be called by the user of the telephone set and the recorded message is played back.

36 Claims, 5 Drawing Figures

CALL INTERCEPTOR

FIELD OF THE INVENTION

This invention relates to automatic telephone answering and message recording equipment.

BACKGROUND OF THE INVENTION

Prior art telephone answering and message recording equipment has existed in two basic forms. Answering services such as doctors use are one example. While answering services fill a need they have shortcomings. They utilize human operators which are relatively expensive and the service cannot be enabled and disabled quickly and simply. In addition, calls cannot be automatically forwarded to another telephone at the option of the user of the service.

Equipment in the form of telephone answering machines with prerecorded announcements and the ability to record messages are also known. However, this approach requires an answering and recording system per telephone set which is very expensive and they require a lot of maintenance. In addition, such systems do not alternatively forward calls to another telephone set. Further, an indication of a recorded message is provided for every answered call whether or not there are actually any recorded messages. The recording, usually magnetic tape, must be played to actually determine if there are any recorded messages. Due to these shortcomings such telephone answering and recording machines have found limited acceptance and use in large office environments although they have wider acceptance in small business and residential use.

Some telephone companies have more recently been providing a telephone answering and message recording service. A telephone company customer may enable or disable the feature at will. A description of the equipment providing this service is found in "New Customer Calling Services", by Bruce I. Hanson et al, *Bell Laboratories Record,* Vol. 58, No. 6, June 1980 which is incorporated herein by reference. This equipment suffers some basic shortcomings. It is not readily apparent to the telephone set user whether or not the service is in effect for their telephone because there is no continuous visual/audible indication of the service. In addition, when messages are recorded the only way the telephone user knows of their existence is by picking up the handset and listening to the dial tone which is interrupted to indicate a message has been recorded. Also, this service does not alternatively provide for transfer of incoming calls to another telephone set at the option of the user.

Thus, there is a need in the art for an inexpensive and simple automatic telephone answering and message recording system that the user knows at a glance is enabled or disabled, that provides a visual indication of the existence of recorded messages, and that does not require recording and playback equipment at each telephone set.

SUMMARY OF THE INVENTION

In accordance with the teaching of our invention we provide a novel, simple and automatic telephone answering and message recording system. The system consists of small, inexpensive and automatic telephone answering equipment located at each telephone set and central message recording equipment shared by all telephones. Using the telephone answering equipment which is a relatively thin piece of equipment on which the associated telephone set would sit, the user can easily enable or disable the automatic telephone answering and message recording function for their telephone set and always has a visual indication of this status. In addition, the user can alternatively transfer unanswered incoming calls to the central message recording equipment or to another telephone set. When an unanswered incoming call is transferred to the central message recorder it provides verbal instructions (prompts) and messages recorded thereon for the user of the telephone set from which the call was transferred. After a message is recorded the message recording equipment calls the telephone set from which the call was originally transferred and sends a signal causing a message waiting visual indication to be given at the telephone answering equipment indicating to the telephone user the existence of the recorded message(s). In turn, the user receives the message by "calling" the message recorder and dialing the extension number of his telephone set. Following the message(s) being played back the message waiting visual indication is terminated by manually pushing a Reset button.

DESCRIPTION OF THE DRAWINGS

Our invention will become more apparent on reading the following detailed description in conjunction with the drawing in which.

DETAILED DESCRIPTION

Before describing FIGS. 1-5 we first describe the general operation of our system. This description will aid in the understanding of the description regarding FIGS. 1-5.

Our novel equipment called the Message Waiting Unit is relatively thin but is large enough so that an associated telephone set conveniently sits on top of it. The controls and indicator lights of our equipment are on a front edge of the Unit to be visible and accessible by the user of the telephone set. Our Message Waiting Unit is provided on a per telephone set basis. The cord or wire by which a telephone set plugs into a junction box on the wall is plugged into our message waiting unit and another wire from our Unit plugs into the junction box. In this manner our message waiting unit is quickly and easily installed for operation by the user of the telephone set. Upon installation the user of the telephone set to which a Unit has been connected performs a simple initialization procedure prior to normal use of our Unit. This initialization is described further in this specification with regards to FIG. 3 and is used to indicate the operating parameters to the Message Recording Equipment which records messages from incoming calls that are automatically transferred to the Equipment Message Waiting Units. Such parameters include the number of times the user's telephone should ring before an unanswered incoming call is to be answered by the Unit and then transferred; and whether an automatically answered call is to be transferred to the Equipment or to an alternate telephone set. The Touch Tone keys on the user telephone to which a Unit is connected is utilized to input the operating parameters to the Equipment which serves a plurality of Message Waiting Units.

Figure 1:
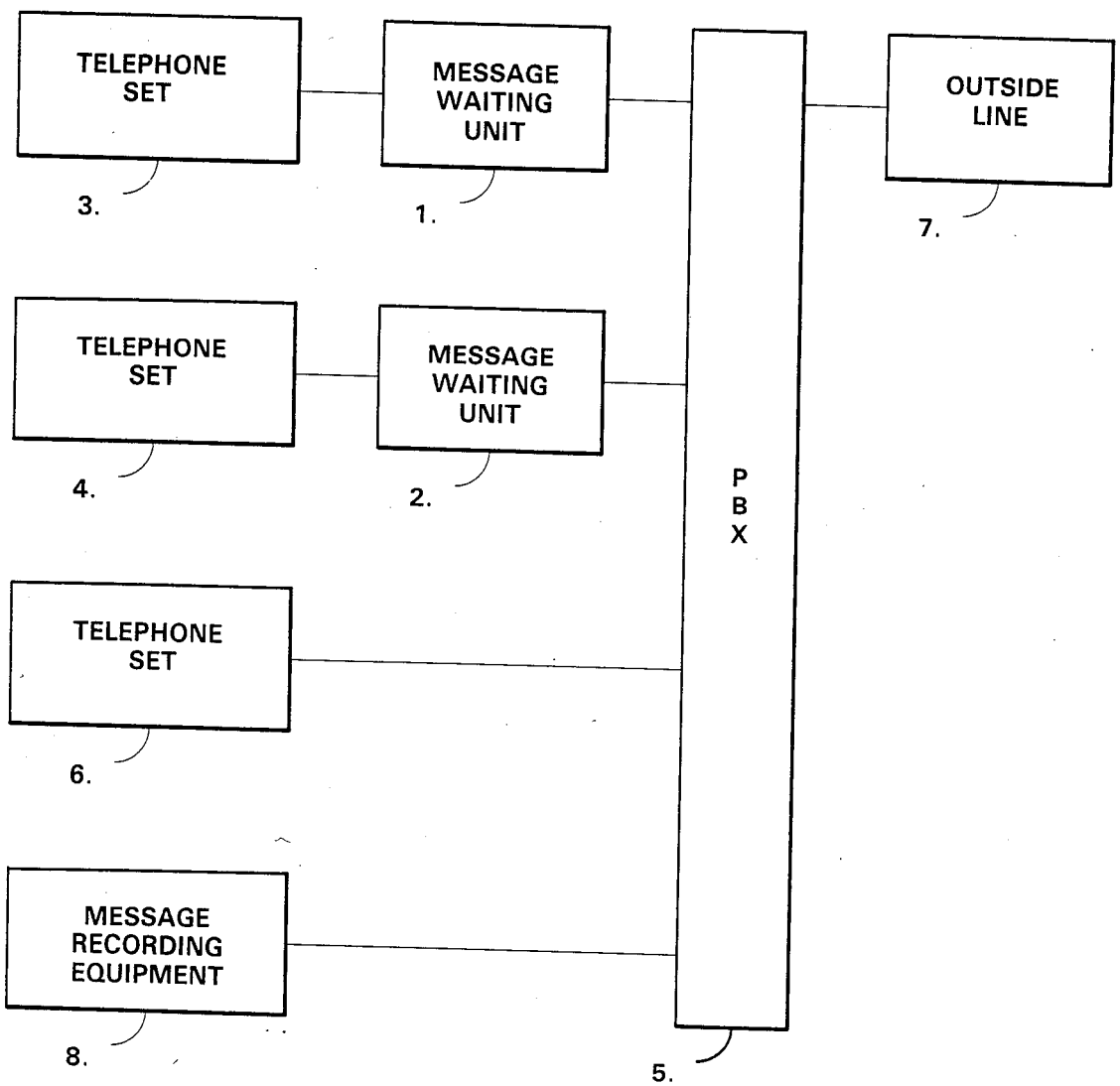
FIG. 1 is a simple block diagram of a private branch exchange showing how our novel equipment relates thereto.

In FIG. 1 is shown a simple block diagram system configuration of the preferred embodiment of the invention. Our Message Waiting Units 1 and 2 are connected to an associated telephone set 3 and 4 respectively, as shown, and are connected to a private branch exchange (PBX) 5 over telephone lines in a conventional well known manner. In typical fashion other telephone sets 6 without our novel Units are connected to PBX 5; and there are outside lines 7 over which calls may be placed outside PBX 5 and over which incoming calls to particular telephone sets connected to the PBX may be completed. In addition, Message Recording Equipment 8 is connected to PBX 5 like telephone sets. PBX 5 may be any private branch exchange well known in the art, such as the Bell System Dimension PBX. Message Recording Equipment may be any of a number of such equipment known in the art but is advantageously the Digital Voice Exchange (DVX) marketed by Wang Laboratories, Inc. The DVX stores messages in digitized form and converts them back to analog form for playback. The new Voice Mail System available from Bell System companies for use with the Dimension PBX equipped with either Feature Packages 8 or 11 may also be easily modified by one skilled in the art to provide the message recording function in accordance with the teaching of our invention. Feature Package 8 is used with larger Dimension PBX's used in corporate networking situations without message waiting lamps as found in our Units. Feature Package 11 is used with smaller Dimension PBX's used by hotels and motels.

Modern PBX's have a call transfer feature, well known in the art, which is utilized in the operation of our invention. Incoming call transfer is initiated by momentarily interrupting the line connecting the telephone to the PBX followed by dialing the number of the telephone set to which the call is to be transferred and then hanging up the telephone set, transferring the incoming call.

After initialization of our Message Waiting Unit a Ready light emitting diode (LED) on the Unit is lit indicating that the Unit is on and is monitoring incoming calls to the associated telephone set to determine if the calls are answered by a user by taking the set off-hook. Calls that are not answered by the user, as determined by the number of ringing cycles equalling a number of ringing cycles input via the user when initializing the Message Waiting Unit, are automatically answered by the Unit which then transfers the incoming call to either another telephone set or to the Message Recording Equipment, this choice being indicated by the user when the Unit is initialized. After automatically answering an incoming call the Unit transfers the call by interrupting the telephone line and then transmitting the number of either the Equipment or other telephone set to which the call is to be transferred. In a well known manner the PBX transfers the incoming call to the alternate telephone set or to the Equipment. When an incoming call is transferred to the Message Waiting Equipment, after being connected thereto the Unit transmits to the Equipment the number of its associated telephone set to which the call was originally directed and then goes on-hook. The calling party whose call is transferred to the Equipment can either hang up or record a message in response to record voice instruction prompts from the Equipment. When the calling party records a message in the Equipment, the Equipment thereafter initiates a call to the telephone set to which the call was originally directed, using the number transmitted to it by the Unit. Upon the Message Waiting Unit answering the call from the Message Recording Equipment to the telephone set, the Equipment forwards a signal which causes the Unit to light a Message Waiting LED on the Unit. The Equipment then goes on-hook, terminating the call to the telephone set. The Message Waiting LED on the Unit remains lit to provide an indication to the user that there is a recorded message for him in the Equipment. To listen to the messages the user then places a telephone call to the Equipment and keys the number of his telephone set. In response thereto the Equipment plays back the recorded message to the user. The user extinguishes the Message Waiting LED by operating a Reset button on the Unit.

Figure 2:
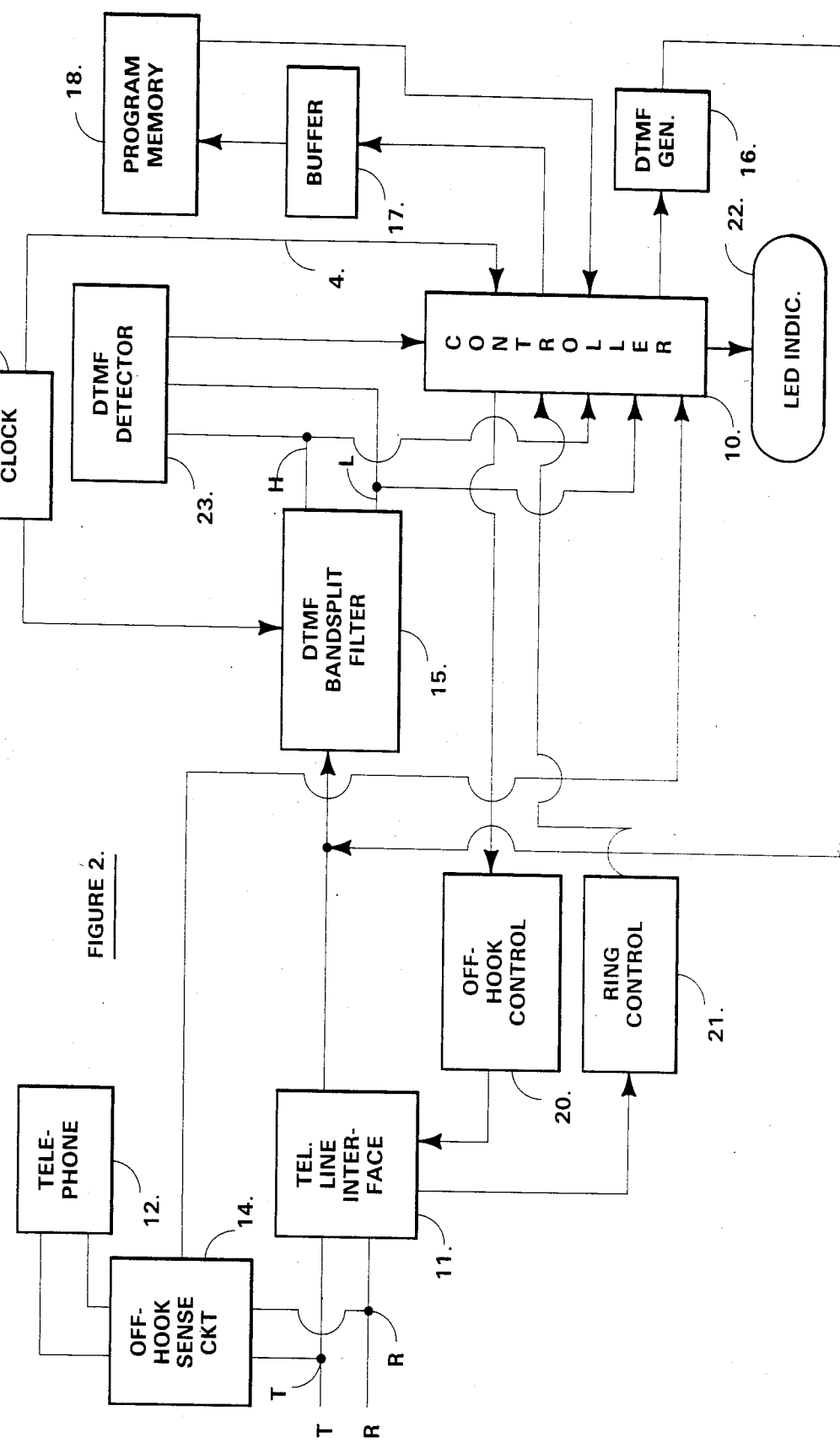
FIG. 2 is a block diagram of the electronics in the automatic call answering equipment located at each telephone set.

In view of the brief system operation described in the last paragraph we now describe the operation of our Message Waiting Unit shown in more detail in block diagram form in FIG. 2. A number of standard integrated circuit chips are utilized in implementing our invention. Controller 10 is a special purpose microprocessor chip known as the 8031 Controller obtainable from Intel Corporation. Telephone line interface circuit 11 is a CH1812 chip available from Cermetek Inc. in Sunnyvale, Calif. Offhook sense circuit 14 is an M949 chip available from Teltone Inc. in Kirkland, Wash. DTMF band split filter 15 is a number 8865 chip available from General Telephone and Electronics (GTE). DTMF detector 23 is a chip number 8860 also available from GTE. DTMF generator 16 is an MK5089 chip available from MOSTEK in Carrolton, Tex. Buffer 17 and program ROM memory 18 are standardly available integrated circuit memories. Off hook control circuit 20 is only a transistor driving circuit amplifying the low level signal output from controller 10 to circuit 20. Ring control circuit 21 is an RC filter connected to 74LS14 chips and cooperate to convert 20 cycle ringing pulses on the telephone line T and R leads to a square wave pulse input to controller 10 for each ringing pulse.

Telephone set 12 is normally connected to telephone line leads T and R which are in turn connected to the PBX, and our Message Waiting Unit is idle and monitors for incoming calls to the set. In this manner telephone set 12 is normally connected to the PBX to be used to initiate and answer calls. When there is an incoming call to telephone set 12, pulsed twenty cycle ringing is applied by the PBX to leads T and R in a manner well known in the art. This ringing signal causes audible ringing to be generated at telephone set 12. This operation is not changed when telephone set 12 is utilized in conjunction with our novel message waiting unit. However, the ringing signal is also applied to our Unit and more specifically to telephone line interface circuit 11 which provides isolation between the Unit and telephone line leads T and R. The ringing signals are passed through circuit 11 to ring control circuit 21 which rectifies and filters the ringing signal to derive a single pulse for each burst of ringing. Each pulse is input to controller 10 to be counted. When the user of telephone set 12 takes the set off-hook, off-hook sense circuit 14 senses this condition and provides a signal indicating same to controller 10. In response to telephone set 12 remaining on-hook as also sensed by offhook sense circuit 14, controller 10 counts the number of ringing pulses and determines if the number of ringing pulses received without telephone set 12 being taken off-hook equals a preprogrammed number of rings. When the number of ringing pulses equals the number programmed during intialization, controller 10 applies a signal via off-hook control circuit 20 which causes telephone line interface circuit 11 to provide an off-hook condition on telephone line leads T and R.

Thereafter, a Busy LED of LED indicators 22 on the Unit is lit. If at any time during ringing a user of telephone set 12 goes off-hook, the Message Waiting Unit stops its operation and returns to its idle state, monitoring the telephone line for unanswered incoming calls after telephone set 12 is again placed on on-hook. The Unit, under control of controller 10, first determines whether the answered incoming call is from the Message Recording Equipment as is determined by the presence of a Dual Tone Multi Frequency (DTMF) pair of Touch-Tone tones corresponding to an * symbol followed by a DTMF tone corresponding to the # symbol. If the DTMF tones are not detected controller 10 applies a signal to off-hook control circuit 20 which thereby controls telephone line interface circuit 11 to place a momentary on-hook condition across telephone line lead T and R. This momentary on-hook condition causes the PBX to transfer the incoming call in a manner well known in the art. Immediately after the momentary on-hook condition controller 10 applies signals to DTMF generator 16 which outputs the Touch-Tone pairs of frequencies indicating the extension number of either the Equipment or the alternate telephone set as determined by the user of the telephone during initialization of the Unit or at any thereafter. The signals output from DTMF generator 16 are applied via telephone line interface circuit 11 to telephone line leads T and R. The PBX responds to the DTMF signals returned to it over telephone line leads T and R to transfer the incoming call as indicated to either the recording Equipment or the alternate telephone set. This is done in a manner well known in the art. No matter where the incoming call is being transferred, controller 10 thereafter applies a signal via circuit 20 to telephone line interface circuit 11 which places the Message Waiting Unit in an on-hook state and the Busy LED is turned off.

When the incoming call has been transferred to the recording Equipment for recording, call controller 10 looks for DTMF signals corresponding to the # signal followed by the * symbol. These DTMF signals are transmitted by the Equipment over telephone line leads T and R, through telephone line interface circuit 11 to DTMF band split filter 15. Filter 15 splits the DTMF incoming signal into its high frequency and low frequency components which it indicates correspondingly on outputs from circuit 15 on lead H and lead L. These outputs from filter 15 are input to DTMF detector 23 which converts the signals indicating the two frequencies to corresponding binary signals which are input to controller 10. Controller 10 responds to the receipt of the # and * signals to transmit the number of telephone set 12 to the Equipment in DTMF form using DTMF generator 16 and other circuits as previously described. Thereafter, controller 10 causes an on-hook condition to be applied to the telephone line leads T and R and turns off the Busy LED of indicators 22 as previously described. The Message Waiting Unit is again monitoring the telephone line for any other incoming calls.

When the caller of the incoming call that is transferred to the Message Recording Equipment records a message therein for the user of telephone set 12, at the end of the recorded message the Equipment uses the number of telephone set 12 previously forwarded to it from set 12 when the call was transferred to the Equipment and places a call to set 12. After the predetermined number of rings the Unit answers the call by placing an off-hook condition across telephone line lead T and R as previously described. The Busy LED on the Unit is lit. The equipment senses the DTMF signals for the # symbol followed by the * symbol as previously described and in response thereto controller 10 transmits the number of telephone set 12 to the Equipment to verify that set 12 is the set for which a message is recorded. In response thereto the Equipment returns DTMF signals for an * followed by an *. In response to the ** controller 10 turns on the Message Waiting LED of indicators 22. Controller 10 then causes an on-hook condition to be placed across line leads T and R and turns off the Busy LED of indicators 22. Again the message waiting unit is in idle state monitoring the telephone line for subsequent unanswered incoming calls.

When the user of the telephone set observes the lit Message Waiting LED, it should indicate that there is a message stored in the Message Recording Equipment. The user takes telephone set 12 off-hook and dials the number of the Equipment in a conventional manner. The Busy LED is also lit. When the Equipment answers this call as indicated by a DTMF # * tone prompt, the user then transmits his telephone number to the Equipment using the Touch Tone keyset. The Equipment responds to this telephone number transmitted to it by the user of telephone set 12 to play back the stored message for telephone set 12. Thereafter, the user depresses the Reset button on the Message Waiting Unit and the Message Waiting LED is extinguished. When telephone set 12 is placed on-hook the Busy LED is extinguished.

The program and parameters for the operation of the Message Waiting Unit are stored in Program Memory 18. Stored program is read out of memory 18 into controller 10, but information is stored in buffer 17 until a full word is assembled which is then stored in memory 18. Examples of information to be stored in memory 18, other than the system program, are the number to which unanswered incoming calls are to be transferred and the number of ringing cycles to be counted before call transfer. Clock 24 provides all necessary timing signals for the operation of the other circuitry in a manner well known in the art. Power for the Message Waiting Unit is obtained from a small supply that plugs into a wall socket near the Unit.

Figure 3:
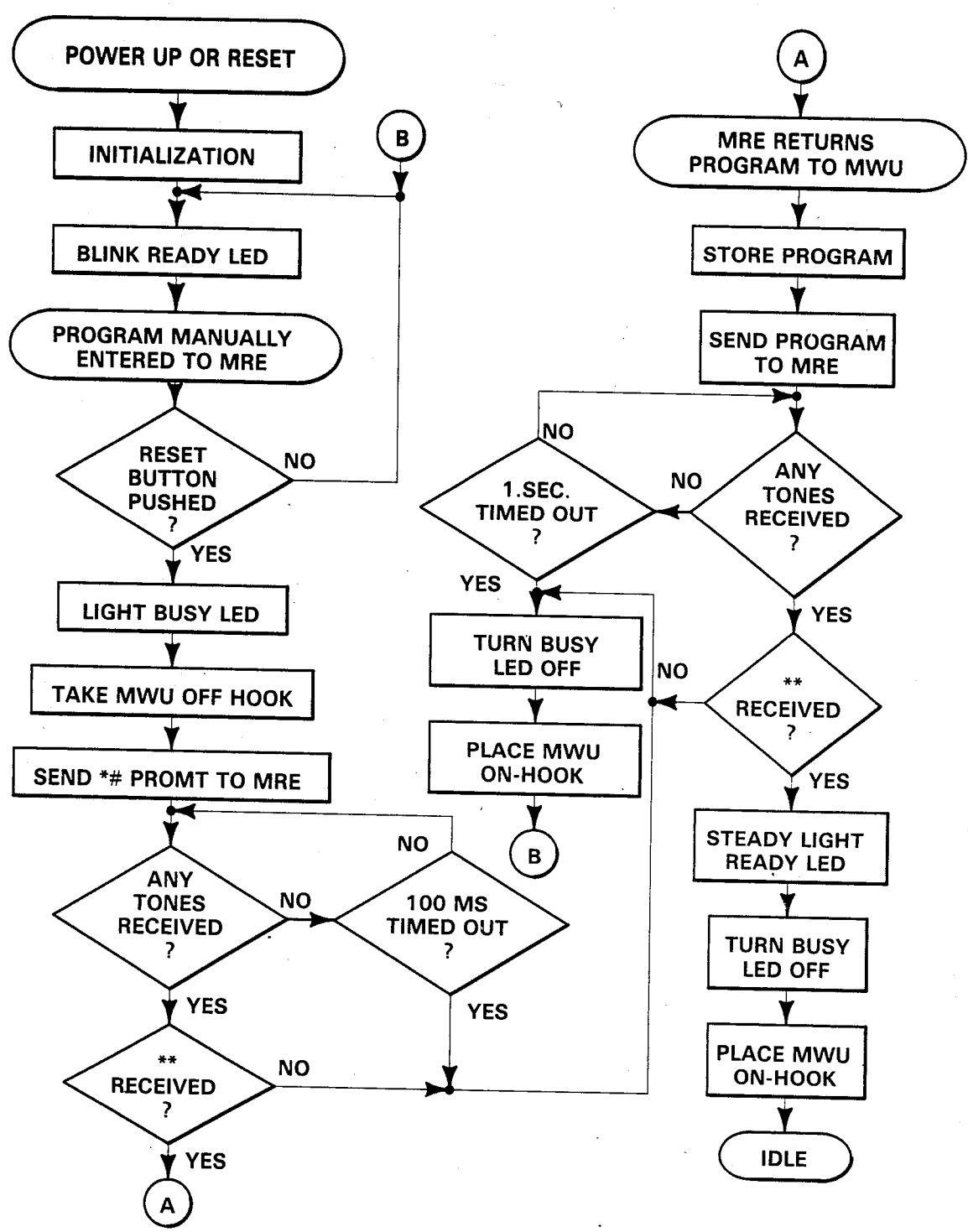
FIGS. 3 through 5 are programming flow charts for the computer program stored and utilized in the call answering equipment.

Turning now to describe the programming flow chart shown in FIG. 3 for the initialization of the Message Waiting Unit. The programming sub-routine, the flow chart for which is shown in FIG. 3, is utilized when power is first applied to the Unit upon it being initially installed or following a power failure. In addition, this subroutine is used when the user desires to change the parameters of operation of the Unit which are the number of rings that are received before the incoming call is transferred, and to change the identity of the extension to which unanswered incoming calls are transferred. Following the beginning of Power Up or Reset, the user changeable information stored in program memory 18 shown in FIG. 1 is erased. Controller 10 also has its access points specified as inputs and outputs for the operation of the system. Thereafter, controller 10 applies an intermittent signal to blink the Ready LED of LED indicators 22. At this point in the sequence the program is manually generated by the user using the standard DTMF Touch Tone pad on telephone set 12. This is done by the user first dialing up the Message Recording Equipment service desk and in response to prompts provided to the user, the user utilizes the Touch Tone key pad on telephone set 12 to first enter the number of rings which must be counted before an incoming call is transferred, then the identity of telephone set 12 and then the number identity of the equipment to which unanswered incoming calls are to be transferred. This equipment may be another telephone set, such as sets 4 or 6 in FIG. 1, or it may be Message Recording Equipment 8 in FIG. 1 for the storage of a message by the caller whose call is transferred to the Equipment. Following the entry of this information the user operates the Reset button on the Unit to indicate to controller 10 that all the information has been entered. When the Reset button is not operated the program recyles through the steps just described starting with the blinking the Ready LED. In the event that the Reset button is operated, controller 10 lights the Busy LED and places the Message Waiting Unit in an off-hook state. Thereafter, controller 10 sends a prompt to the Equipment of the DTMF tones for an * # to the Equipment indicating that the Message Waiting Unit is ready to be programmed by the Equipment. In response to the * # signals transmitted by the Unit to the Equipment the Equipment returns a  acknowledgement signal to the unit. The presence of any tones on the telephone line leads T and R are monitored by the Unit to detect this acknowledgement signal. Tones on the telephone line leads are watched for a period of 100 milliseconds. If tones are detected they are checked to see if they are the  acknowledgement signal tones. If the  signals are not received within the 100 millisecond period or other tones are received, controller 10 turns off the Busy LED, places the Unit on-hook, blinks the Ready LED and restarts the initialization program. Following the 100 millisecond period when the  acknowledgement signal is detected, the Equipment returns DTMF signals to the message waiting unit indicating the number of ring signals that must be observed before an unanswered incoming call is transferred, and indicating the number to which a user unanswered incoming call is to be transferred. These parameter signals are received and stored in memory 18 of the Message Waiting Unit. For purposes of verification the parameters received from the Message Waiting Equipment and stored in memory 18 are then read out therefrom and sent in DTMF signalling format to the Equipment which compares these signals with those signals it originally transmitted to the Unit. If there is an error and the signals don't match, the Equipment doesn't forward a DTMF  verification signal to the Unit. If there is a match, the DTMF  verification signal is sent to the Unit which is watching for these tones for a period of one second. When the last mentioned DTMF  tones are not received at the Unit, controller 10 turns off the Busy LED, places the Unit on-hook, blinks the Ready LED and restarts the initialization program. In normal operation the DTMF  signals ae received from the Equipment indicating that parameters stored in memory 18 are correct. Controller 10 then lights the Ready LED steady, the Busy LED is turned off and the Unit places an on-hook condition on the telephone line leads T and R. At this time the Message Waiting Unit is fully initialized, will monitor all incoming calls and will transfer calls which are not user answered in accordance with the parameters entered during the initialization phase.

Figure 4:
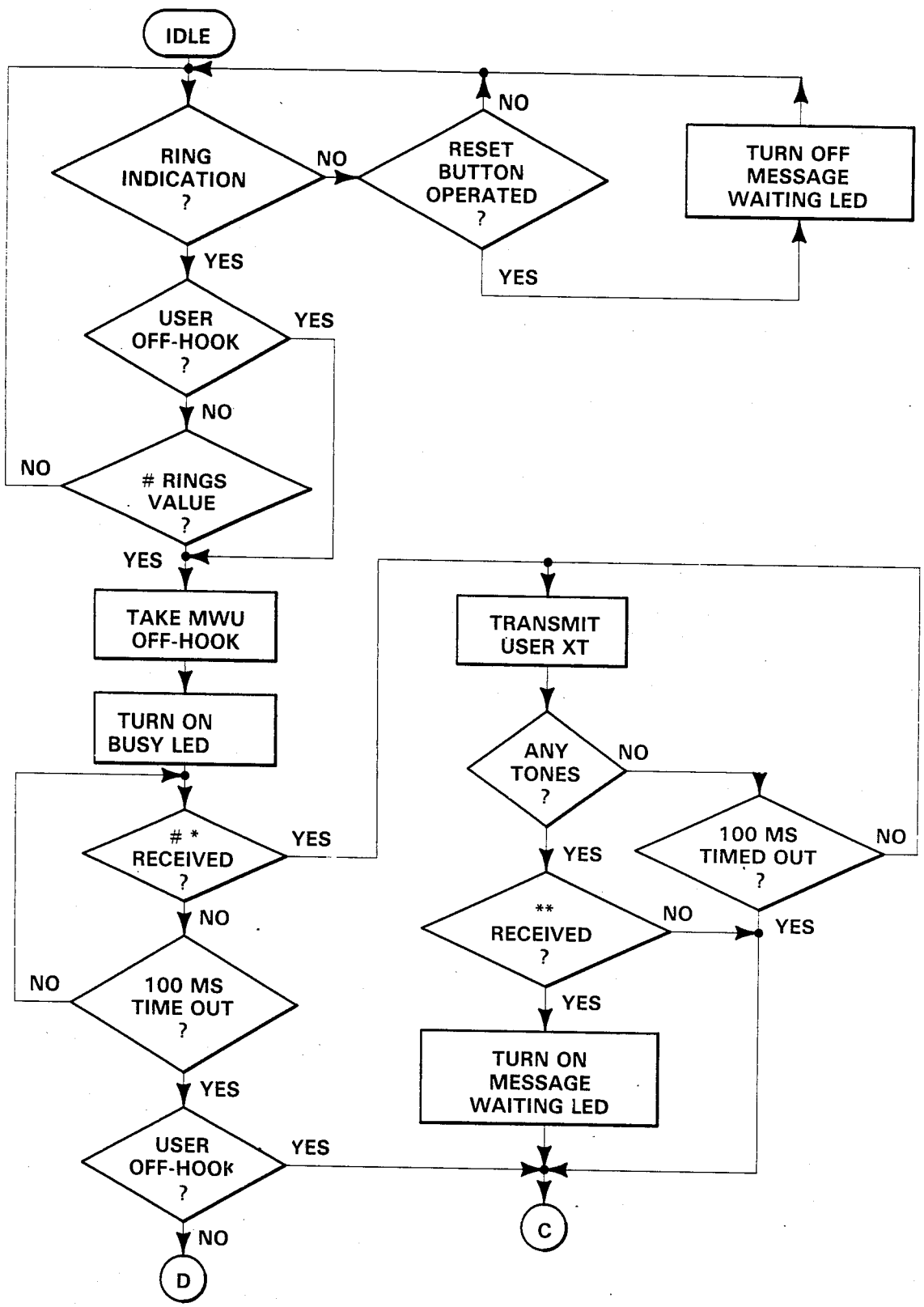
Figure 5:
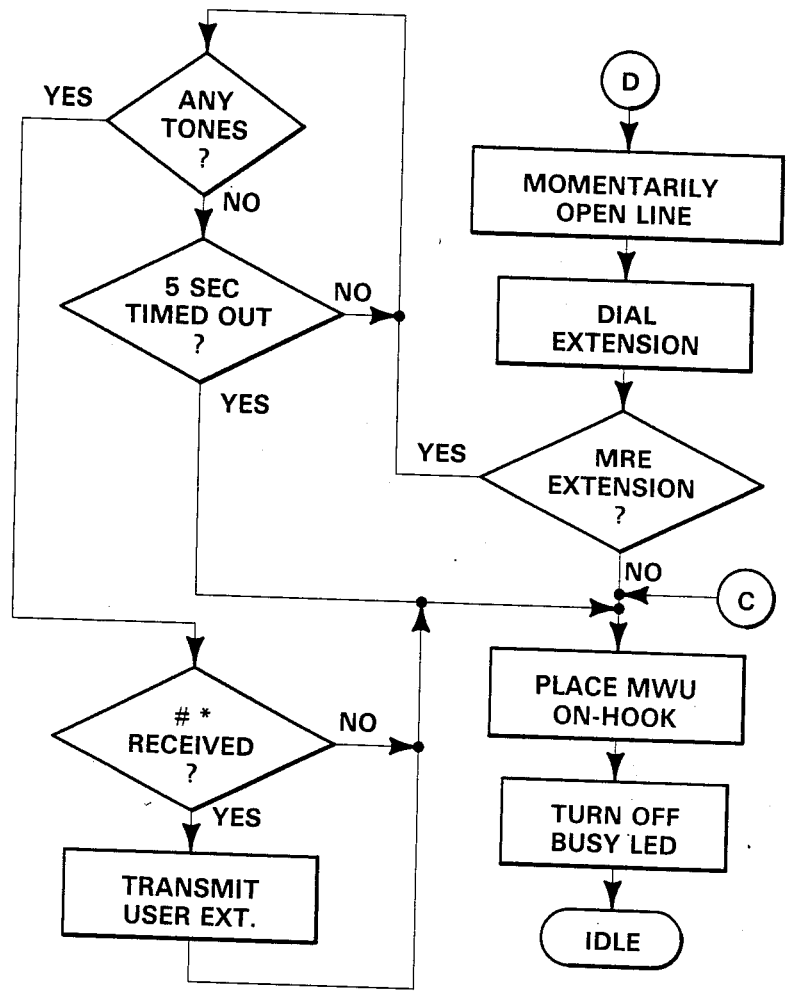

In FIGS. 4 and 5 are the programming flow charts for the program controlling controller 10 after the Unit has been initialized. The Unit is initially in an idle state monitoring incoming calls and transferring those calls which are not user answered after the predetermined number of ring cycles. The first step in this program is to monitor for the presence of any ringing signals. When there are no ringing signals the program branches and determines if the Reset button is operated. If the Reset button is not operated the program cycles back to again monitor for the presence of ringing signals. In the event that the Reset button is operated the program generates a signal to turn off the Message Waiting LED. In the event that the Message Waiting LED is already off it will remain in that state. When a ringing signal is finally detected the program progresses to the next step to determine if the telephone set is on-hook or off-hook. Upon the telephone set being on-hook the program progresses to the next step in which it determines if the number of ringing pulses received equals the number of ringing pulses to be received before an unanswered incoming call is transferred. If the predetermined number of ringing pulses has not been received the program cycles back to the beginning of the program to watch for the next ringing pulse. In either the event that the user goes off-hook before the programmed number of ringing pulses has been received, or in the event that the number of ringing pulses equals the programmed number, the program progresses to the next step in which the Message Waiting Unit places an off-hook condition on the telephone line leads and the Busy LED is turned on. The program then checks to see if this call is from the Message Waiting Equipment or if the call is from a calling party. This determination is made by looking for the presence of DTMF signals for # *. If the DTMF # * signals are received, the incoming call is from the Equipment and the program branches to transmit the extension of the associated telephone set 12 in DTMF form over the telephone line to the Equipment. Following transmission of the telephone set identity, for 100 milliseconds the program watches for tones received back from the Equipment indicating that is has received the telephone set identity. The DTMF ** signals indicate that the telephone set identity has been received at the Equipment and thereafter controller 10 lights the Message Waiting LED to indicate to the user of telephone set 12 that there is a message recorded in the Equipment. The program then branches at point C in FIG. 4 which goes into the flow chart in FIG. 5 wherein the Message Waiting Unit is placed in an on-hook state followed by the Busy LED being turned off. The Message Waiting Unit is now in an idle condition monitoring the telephone line of telephone set 12 for unanswered incoming calls.

Backing up in the program to FIG. 4, these are the programming steps to be followed when the incoming call is not from the DVX. When no DTMF # * tones are received from the Equipment within a 100 millisecond timing period the program rechecks to see if telephone set 12 has been taken off-hook by the user. In addition, the program knows that this incoming call is from a calling party. The call may be from another telephone set connect to the PBX, such as sets 4 or 6 in FIG. 1, or may be incoming to the PBX from an external telephone set. If telephone set 12 is off-hook it is connected directly to telephone line leads T and R. The program branches at point C as described hereinabove to place the Message Waiting Unit in an on-hook state, to turn off the Busy LED, and thereby leave the Unit in its Idle state.

In the event, however, that the user has not taken telephone set 12 off-hook at this time, the program branches at point D in FIG. 4 which goes to the program flow chart in FIG. 5. At this time the Message Waiting Unit knows that the incoming call is from a calling party internal or external to the PBX telephone system and that the call must be transferred to either another telephone set or to the Message Recording Equipment whereat a message may be recorded by the calling party. To accomplish the transfer function the program momentarily interrupts the telephone line followed by DTMF dialing the extension to which the calling party is to be transferred. As just mentioned the calling party will either be transferred to another telephone set or to the Equipment. This decision was made during the initialization phase of the Message Waiting Unit as previously described.

Controller 10 under the control of the program stored in memory 18 now determines if the call is being transferred to the Message Recording Equipment. When the user unanswered call is to be transferred to another telephone set, the program places the Unit on-hook, turns off the Busy LED and the Unit is now in its Idle state. In the event that the calls are to be transferred to the Equipment whereat a message may be recorded, the program watches for the Equipment to answer the transferred call by watching for acknowledgement tones being returned from the Equipment within a five second period. One of two things may happen at this time. Either tones will or will not be received on the telephone line during this five second period. If tones are received within the five second period, the program checks them to see if they are the DTMF # * tones indicating that the Equipment has answered the transferred call. Upon the # * tones being detected the program causes the identity of telephone set 12 be transmitted to the Equipment which then knows the telephone set for which the soon to be recorded message is intended. Thereafter, the program places the Message Waiting Unit in an on-hook state, turns off the Busy LED and the Unit is in its Idle state. In a well known manner the PBX connects the Equipment to the transferred calling party.

In the event that the tones detected on the telephone line during the five second timing period are not the # * tones, the program also places the Message Waiting Unit in an on-hook state, turns off the Busy LED and thereby leaves the Unit in its Idle state. Likewise, if the five second timing period times out without the receipt of any tones, the program also places the Unit in an on-hook state, turns off the Busy LED and thereby leaves the Unit in its Idle state. It can only be assumed that the lack of receipt of the # * acknowledgement signal from the Equipment indicates that there is trouble with the Equipment.

While what has been described hereinabove is the equipment and operation for the preferred embodiment of our invention it will be recognized by those skilled in the art that numerous changes and modifications may be made without departing from the spirit and scope of the invention. For example, voice synthesis equipment may be added to the Message Waiting Unit to provide synthetic voice messages to the calling party indicating, for example, that the call is to be transferred. Further, the user decision of where an unanswered call is being transferred may be eliminated.

What we claim is:

1. Automatic telephone call answering apparatus located at and functioning with telephone sets connected via telephone set lines to central switching equipment, each telephone set having its own telephone number, and central message recording equipment also connected to the switching equipment via a telephone line and having its own telephone number, said recording equipment for recording messages intended for users of said telephone sets, said call answering apparatus comprising:

means for answering an incoming call not answered by a user of a first one of said telephone sets by placing an off-hook condition on said first telephone set line, means for controlling said call answering means to place a momentary on-hook condition on said first telephone set line to signal said switching equipment that said incoming call is to be transferred, and signalling means responsive to said controlling means for sending the telephone number of said recording equipment to said switching equipment which then connects said incoming call to said recording equipment, then upon said recording equipment answering said transferred incoming call said controlling means controls said signalling means to signal the telephone number of said first telephone set so said recording equipment knows the telephone set for which said transferred incoming call is intended, whereupon said recording equipment records a message of said transferred incoming call and at some later time, the user of said first telephone set dials the telephone number of said recording equipment and upon said recording equipment answering, the user dials the telephone number of said first telephone set to which the recording equipment responds and plays back the recorded message.

2. The invention in accordance with claim 1 wherein said answering means comprises:

means for sensing ringing signals indicating an incoming call directed to said first telephone set, and means for placing an off-hook condition on said first telephone set line to answer incoming calls not answered by a user of said first telephone set, said controlling means being responsive to said sensing circuit for operating said off-hook means to answer said incoming call, and for operating said off-hook means to place said momentary on-hook condition on said first telephone set line.

3. The invention in accordance with claim 2 wherein said recording equipment calls said first telephone set using said first telephone set number forwarded to it when said incoming call is transferred to it only when the message of said transferred incoming call has been recorded, and said recording equipment transmits a first signal upon an off-hook condition being placed on said first telephone set line responsive to said recording equipment call, and wherein said call answering apparatus further comprises:

means for detecting said first signal by monitoring every user unanswered call automatically answered by said off-hook means, said detecting means providing an indication of the presence of said first signal to said controlling means which responds thereto not to transfer said incoming call from said call answering apparatus to said recording equipment, and means responsive to said controlling means receiving said first signal indication for providing an indication to the user of said first telephone set of the recorded message in said recording equipment.

4. The invention in accordance with claim 3 further comprising means for detecting if said first telephone set is on-hook or has been taken off-hook by the user, said controlling means being responsive to said detecting means providing an off-hook indication for not operating said off-hook means.

5. The invention in accordance with claim 4 wherein said indication means is a visual indicator.

6. In a telephone system in which items of apparatus including a plurality of telephone sets and central recording apparatus for recording messages received by means of telephone calls are connected by means of telephone set lines to a central switching apparatus which associates each item with a telephone number and responds to a given telephone number by accessing the item associated therewith and in which the central switching apparatus is capable of transferring a call by accessing another item in place of an item currently being accessed, the method of employing a message waiting unit which is connected to the telephone set line connecting a first one of the telephone sets to the central switching apparatus and which includes storage means to answer an incoming call directed to the first telephone set comprising the steps of:

detecting in the message waiting unit that a user of the first telephone set has not answered the incoming call; employing the message waiting unit to cause the central switching apparatus to transfer the incoming call to the central recording apparatus; and employing the message waiting unit to provide a stored telephone number of the first telephone set to the central recording apparatus, whereby the incoming call is transferred to the central recording apparatus for recording of any message and the central recording apparatus receives the telephone number of the first telephone set.

7. The method in accordance with claim 6 further comprising the step of:

providing an indication in said message waiting unit of a message stored in said central recording apparatus following the step of employing the message waiting unit to provide the stored telephone number to the central recording apparatus.

8. The method in accordance with claim 7 and wherein the step of employing the message waiting unit to provide the stored telephone number further comprises the steps of:

immediately following the step of employing the message waiting unit to cause the central switching apparatus to transfer the incoming call, monitoring the telephone set line connected to the first telephone set for a first signal from said central recording apparatus indicating that said central recording apparatus is connected to said first telephone set, and forwarding the stored number of the first telephone set to said central recording apparatus.

9. The method in accordance with claim 8 where said step of providing an indication comprises the steps of:

placing a call from said recording apparatus to said message waiting apparatus via said switching apparatus under control of said recording apparatus following recording of any message from the incoming call, sending a second signal from said recording apparatus to said message waiting apparatus after said message waiting apparatus applies an off-hook condition to said first telephone line, said second signal indicating that said recording apparatus is connected to said first telephone set, returning the stored telephone number from said message waiting apparatus to said recording apparatus in response to said second signal, said returned telephone number confirming the connection of said first telephone set to said recording apparatus, and sending a third signal from said recording apparatus to said message waiting apparatus, said third signal causing said message waiting apparatus to indicate that said recording apparatus contains a message received from the incoming call.

10. The method in accordance with claim 8 wherein said step of forwarding the stored telephone number comprises the steps of:

placing an off-hook condition on said first telephone line;

checking for the presence of a second signal; and upon detecting said second signal, forwarding the stored telephone number.

11. The method of claim 6 wherein the central switching apparatus accesses items by providing a plurality of ring signals to them;

the method further comprises the step of employing the first telephone set and the central recording apparatus to input a number of rings value to the storage means; and the step of detecting that a user of the first telephone set has not answered the incoming call is performed by counting ring signals unitl the stored number of rings value is exceeded.

12. The method of claim 6 and further comprising:

employing the first telephone set and the central recording apparatus to input the telephone number of the first telephone set to the storage means.

13. The method of claim 6 and wherein:

the method further comprises the step of employing the first telephone set and the central recording apparatus to input the telephone number of the central recording apparatus to the storage means; and the step of employing the message waiting unit to cause the central switching apparatus to transfer the incoming call to the central recording apparatus is performed by providing the stored telephone number of the central recording apparatus to the central switching apparatus.

14. In a telephone system in which items of apparatus including a plurality of telephone sets and central recording apparatus for recording messages received by means of telephone calls are connected by means of telephone set lines to a central switching apparatus which associates each item with a telephone number and responds to a given telephone number by accessing the item associated therewith and in which the central switching apparatus is capable of transferring a call by accessing another item in place of an item currently being accessed, the method of employing a message waiting unit which is connected to the telephone set line connecting a first one of the telephone sets to the central switching apparatus and which includes storage means to answer an incoming call directed to the first telephone set comprising the steps of:

detecting in the message waiting unit that a user of the first telephone set has not answered the incoming call;

determining in the message waiting unit whether the incoming call is from the central recording apparatus; and if the incoming call is not from the central recording apparatus, employing the message waiting unit to cause the central switching apparatus to transfer the incoming call to the item associated with a stored forwarding telephone number stored in the storage means.

15. The method of claim 14 and further comprising:
employing the first telephone set and the central recording apparatus to input the forwarding telephone number to the storage means.

16. The method of claim 14 wherein
the stored forwarding telephone number is alternatively the telephone number of the central recording apparatus or the telephone number of another one of the items; and the method further comprises the steps of:

detecting in the message waiting unit that the central recording apparatus has answered the transferred incoming call; and when the central recording apparatus has answered the transferred incoming call, employing the message waiting unit to provide a stored telephone number of the first telephone set stored in the storage means to the central recording apparatus.

17. The method of claim 16 and further comprising:
employing the first telephone set and the central recording apparatus to input the forwarding telephone number and the telephone number for the first telephone set to the storage means.

18. The method of claim 14 wherein
the central switching apparatus accesses items by providing a plurality of ring signals to them;

the method further comprises the step of employing the first telephone set and the central recording apparatus to input a number of rings value to the storage means; and the step of detecting that a user of the first telephone set has not answered the incoming call is performed by counting ring signals until the stored number of rings value is exceeded.

19. In a telephone system, the method of programming programmable apparatus associated with a first telephone line comprising the steps of:

calling programming means associated with a second telephone line from other apparatus associated with the first telephone line;

using the other apparatus to input a parameter to the programming means;

providing the parameter from the programming means to the programmable apparatus via the first telephone line; and storing the parameter in the programmable apparatus.

20. The method of claim 19 and further comprising:

indicating to the programmable apparatus that the parameter input is finished; and employing the programmable apparatus to provide a first signal to the programming means indicating that the programmable apparatus is ready to be programmed.

21. The method of claim 20 and wherein:
the step of using the other apparatus to input a parameter to the programming means is repeated until all of a plurality of parameters have been input;

the step of indicating to the programmable apparatus that the parameter input is finished is performed after all of the parameters have been input; and the steps of providing the parameter to the programmable apparatus and storing the parameter therein are repeated for each of the parameters.

22. The method of claim 20 and further comprising:
employing the programmable apparatus to provide the stored parameter to the programming means;

verifying the stored parameter in the programming means; and providing a second signal to the programmable apparatus indicating whether the stored parameter is valid.

23. The method of claim 20 and further comprising:
the step of using the programming means to provide an audible prompt to the first telephone set following the step of calling the programming means.

24. In a telephone system in which items of apparatus including a plurality of telephone sets and central recording apparatus for recording messages received by means of telephone calls are connected by means of telephone set lines to a central switching apparatus which associates each item with a telephone number and responds to a given telephone number by accessing the item associated therewith and in which the central switching apparatus is capable of transferring a call by accessing another item in place of an item currently being accessed, the method of programming message waiting apparatus which is connected to the telephone set line connecting a first one of the telephone sets to the central switching apparatus and which includes storage means comprising the steps of:

calling the central recording apparatus from the first telephone set;

using the first telephone set to input a parameter to the central recording apparatus;

indicating to the message waiting apparatus that parameter input is finished;

employing the message waiting apparatus to provide a first signal to the central recording apparatus indicating that the message waiting apparatus is ready to be programmed; and receiving the parameter in the message waiting apparatus from the central recording apparatus and storing the parameter in the storage means.

25. The method of claim 24 and wherein:
the step of using the first telephone set to input a parameter to the central recording apparatus is repeated until all of a plurality of parameters have been input;

the step of indicating to the message waiting apparatus that the parameter input is finished is performed after all of the parameters have been input; and the step of receiving the parameter in the message waiting apparatus and storing the parameter in the storage means is repeated for each of the parameters.

26. The method of claim 25 wherein:
the plurality of parameters includes a number of rings parameter, a forwarding number parameter, and a number of the first telephone set parameter.

27. The method of claim 24 and further comprising:
causing the message waiting apparatus to provide the stored parameter to the central recording apparatus;
verifying the stored parameter in the central recording apparatus; and
providing a second signal to the message waiting apparatus indicating whether the stored parameter is valid.

28. The method of claim 24 and further comprising:
the step of using the programming means to provide an audible prompt to the first telephone set following the step of calling the programming means.

29. Automatic telephone call answering apparatus comprising:
items of apparatus associated with telephone numbers and including a plurality of telephone sets and central programming apparatus for receiving at least a telephone number parameter which specifies one of the telephone numbers and which is input via a telephone call received therein from a first one of the plurality of telephone sets;
central switching apparatus connected by a plurality of telephone lines to the items for responding to a given telephone number by accessing the item associated therewith, said central switching apparatus being capable of transferring a call by accessing another item in place of the item currently being accessed; and
programmable message waiting apparatus connected to the telephone line for the first telephone set for receiving the telephone number parameter from the central programming apparatus, storing the telephone number parameter, and thereafter detecting that a user of the first telephone set has not answered an incoming call directed to the first telephone set and causing the switching apparatus to transfer the incoming call as directed by the telephone number parameter.

30. The automatic telephone call answering apparatus of claim 29 wherein:
the central programming apparatus further records a message of any incoming call transferred thereto; and
the telephone number parameter specifies in the alternative the telephone number of the central programming apparatus and the telephone number of another one of the items.

31. The automatic telephone call answering apparatus of claim 29 wherein:
the central programming apparatus receives additional parameters in addition to the telephone number parameter and
the programmable message waiting apparatus receives and stores the additional parameters in addition to the telephone number parameter.

32. The automatic telephone call answering apparatus of claim 31 wherein:
the additional parameters include the telephone number of the first telephone set; and
the programmable message waiting apparatus provides the telephone number of the first telephone set to the central programming apparatus when an incoming call is transferred thereto.

33. The automatic telephone call answering apparatus of claim 31 wherein:
the central switching apparatus accesses items by providing a plurality of ring signals to them,
the additional parameters include a number of rings value; and
the programmable message apparatus detects that the user of the first telephone set has not answered the incoming call by counting the number of rings until the number specified in the second parameter is exceeded.

34. Automatic telephone call answering apparatus comprising:
items of apparatus including
a plurality of telephone sets and
central recording apparatus for recording messages of telephone calls received therein, associating telephone numbers therewith, and providing a given recorded message in response to the telephone number associated therewith;
central switching apparatus connected by a plurality of telephone lines to the items for associating the items with telephone numbers and responding to a given telephone number by accessing the item associated therewith, said central switching apparatus being capable of transferring a call by accessing another item in place of an item currently being accessed; and
message waiting apparatus connected to the telephone line for a first one of the telephone sets for detecting that a user of the first telephone set has not answered an incoming call directed to the first telephone set, causing the central switching apparatus to transfer the incoming call to the central recording apparatus, and thereafter providing the telephone number of the first telephone set to the central recording apparatus,
whereby the central recording apparatus is able to record the message of the incoming call and associate the recorded message with the telephone number of the first telephone set.

35. The automatic telephone call answering apparatus of claim 34 wherein:
the central recording apparatus is further capable of employing a recorded telephone number to call the item associated with the telephone number associated with the message of the incoming call and provide a message waiting signal on the telephone line belonging to the item;
the messsage waiting apparatus further includes means for indicating that the message of the incoming call has been recorded; and
the message waiting apparatus responds to the message waiting signal by causing the means for indicating that the message of the incoming call has been recorded to so indicate.

36. Apparatus for use in a telephone system comprising:
programming means associated with a first telephone line in the telephone system for receiving a parameter input via a call received on the first telephone line from apparatus associated with a second telephone line; and
programmable apparatus associated with the second telephone line for receiving the parameter from the programming means via the second telephone line, storing the parameter, and responding to calls received on the second telephone line in accordance therewith.

* * * * *